United States Patent
Cox et al.

(10) Patent No.: US 11,190,470 B2
(45) Date of Patent: Nov. 30, 2021

(54) ATTACHMENT ANALYTICS FOR ELECTRONIC COMMUNICATIONS

(71) Applicant: INTERNATIONAL BUSINESS MACHINES CORPORATION, Armonk, NY (US)

(72) Inventors: Susan Marie Cox, Rochester, MN (US); Janani Janakiraman, Austin, TX (US); Nadiya Kochura, Worcester County, MA (US); Fang Lu, Billerica, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/287,298

(22) Filed: Feb. 27, 2019

(65) Prior Publication Data
US 2020/0274836 A1    Aug. 27, 2020

(51) Int. Cl.
*H04L 12/58*     (2006.01)

(52) U.S. Cl.
CPC .............. *H04L 51/08* (2013.01); *H04L 51/12* (2013.01); *H04L 51/16* (2013.01); *H04L 51/32* (2013.01)

(58) Field of Classification Search
CPC ...... G06Q 10/10; G06Q 10/107; G06Q 50/01; H04L 51/08; H04L 51/12; H04L 51/00; H04L 51/04; H04L 51/14; H04L 51/16; H04L 51/22; H04L 51/28; H04L 51/32; H04L 51/38; G06F 40/30
See application file for complete search history.

(56) References Cited

U.S. PATENT DOCUMENTS

| 6,453,338 | B1 * | 9/2002 | Shiono | G06Q 10/107 379/93.24 |
| 6,546,390 | B1 * | 4/2003 | Pollack | G06Q 10/107 |
| 6,615,242 | B1 * | 9/2003 | Riemers | H04L 51/12 709/206 |
| 8,286,085 | B1 * | 10/2012 | Denise | G06Q 10/107 715/752 |
| 10,877,977 | B2 * | 12/2020 | Garg | H04L 51/12 |
| 2005/0135681 | A1 * | 6/2005 | Schirmer | G06Q 10/107 382/229 |

(Continued)

OTHER PUBLICATIONS

Ammari, Ahmad, Vania Dimitrova, and Dimoklis Despotakis. "Semantically enriched machine learning approach to filter YouTube comments for socially augmented user models." UMAP (2011): 71-85. (Year: 2011).*

(Continued)

*Primary Examiner* — Nivek Srivastava
*Assistant Examiner* — William C McBeth
(74) *Attorney, Agent, or Firm* — Cantor Colburn LLP; Edward Wixted

(57) ABSTRACT

Methods, systems, and computer program products for electronic communication operations are provide. Aspects include receiving communication data associated with an electronic communication, wherein the communication data includes textual data, analyzing attachment data associated with an attachment to the electronic communication, comparing the communication data to the attachment data to determine a relevancy score, and based on the relevancy score, enacting an action for the electronic communication.

4 Claims, 5 Drawing Sheets

(56) References Cited

U.S. PATENT DOCUMENTS

| | | | |
|---|---|---|---|
| 2007/0233777 A1* | 10/2007 | Bates | H04L 51/00 709/202 |
| 2010/0198931 A1 | 8/2010 | Pocklington et al. | |
| 2013/0013624 A1 | 1/2013 | Malik et al. | |
| 2013/0232205 A1 | 9/2013 | Gorecha et al. | |
| 2014/0156996 A1* | 6/2014 | Heppe | G06Q 30/00 713/175 |
| 2014/0237042 A1* | 8/2014 | Ahmed | H04L 51/32 709/204 |
| 2014/0359480 A1* | 12/2014 | Vellal | H04L 51/12 715/752 |
| 2015/0378986 A1* | 12/2015 | Amin | H04L 51/12 704/9 |
| 2016/0062984 A1* | 3/2016 | Caliendo, Jr. | G06Q 10/107 704/9 |
| 2016/0124942 A1* | 5/2016 | Amin | G06Q 50/01 704/2 |
| 2016/0188597 A1* | 6/2016 | Moore | H04L 51/12 707/749 |
| 2016/0191548 A1* | 6/2016 | Smith | H04L 63/1483 726/23 |
| 2018/0032898 A1* | 2/2018 | Wu | G06Q 50/01 |
| 2018/0357323 A1* | 12/2018 | Allen | G06Q 50/01 |
| 2019/0052591 A1* | 2/2019 | Mahmoud | H04L 51/12 |
| 2019/0121866 A1* | 4/2019 | Garg | G06Q 50/01 |
| 2019/0149501 A1* | 5/2019 | Bastide | H04L 51/16 709/206 |
| 2019/0272559 A1* | 9/2019 | Lee | G06F 40/30 |
| 2020/0045001 A1* | 2/2020 | Mathur | H04L 51/08 |
| 2020/0067861 A1* | 2/2020 | Leddy | H04L 51/12 |

OTHER PUBLICATIONS

Shanmugasundaram, G., S. Preethi, and I. Nivedha. "Investigation on social media spam detection." 2017 International Conference on Innovations in Information, Embedded and Communication Systems (ICIIECS). IEEE, 2017. (Year: 2017).*

Verma, Rakesh, Narasimha Shashidhar, and Nabil Hossain. "Two-pronged phish snagging." 2012 Seventh International Conference on Availability, Reliability and Security. IEEE, 2012. (Year: 2012).*

Lipka, Nedim, Tak Yeon Lee, and Eunyee Koh. "Detecting Link and Landing Page Misalignment in Marketing Emails." International Conference on Database and Expert Systems Applications. Springer, Cham, 2018. (Year: 2018).*

* cited by examiner

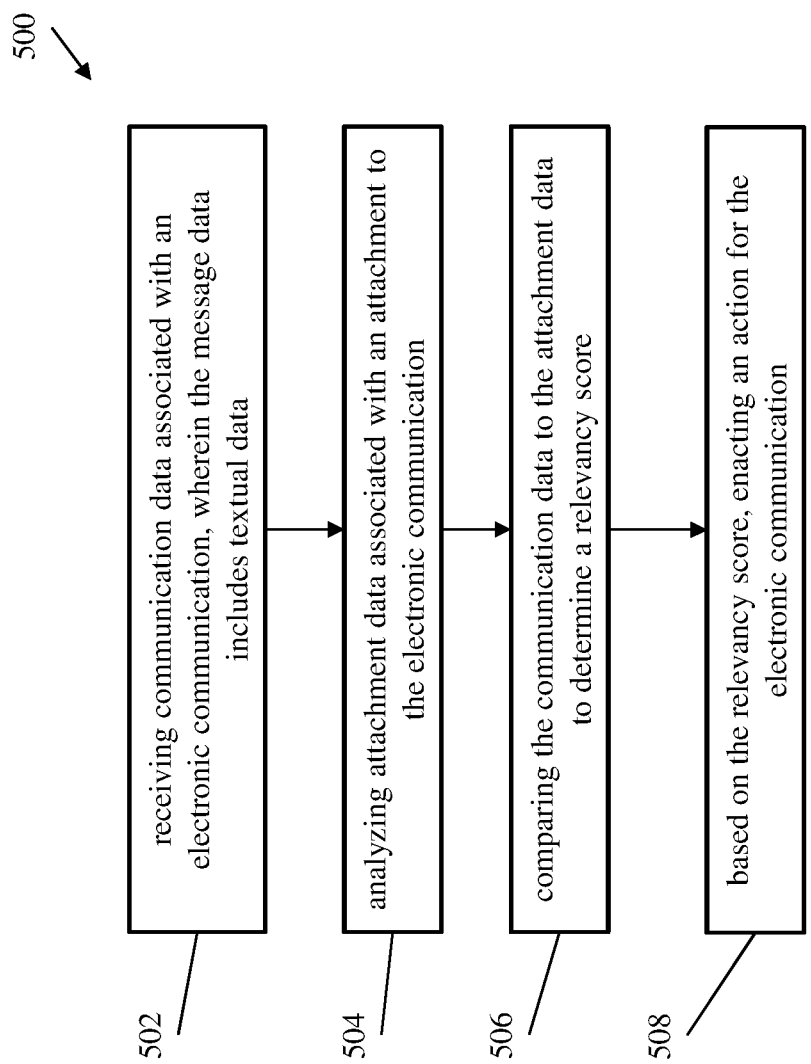

ATTACHMENT ANALYTICS FOR ELECTRONIC COMMUNICATIONS

BACKGROUND

The present invention generally relates to electronic communications, and more specifically, to attachment analytics for electronic communications.

Electronic communication such as, for example, emails, text messages, and social media posts are now the norm in both individual and business lives. Due to having the ability to quickly compose and send these electronic communications, problems arise from sending a message to a wrong recipient by mistake. Sending a message to a wrong recipient can often cause issues with recipient such as sharing private or confidential information with an improper party. Most electronic communications have additional functionality where, in addition to textual data, an attachment can be included. Attachments can range from images or pictures to confidential personal or business information. Improper sharing of certain attachments for electronic communications can have severe consequences especially in business fields such as the legal and medical field.

SUMMARY

Embodiments of the present invention are directed to a computer-implemented method for electronic communication operation. A non-limiting example of the computer-implemented method includes receiving communication data associated with an electronic communication, wherein the communication data includes textual data, analyzing attachment data associated with an attachment to the electronic communication, comparing the communication data to the attachment data to determine a relevancy score, and based on the relevancy score, enacting an action for the electronic communication.

Embodiments of the present invention are directed to a system for electronic communication operation. A non-limiting example of the system includes a processor communicatively coupled to a processor, wherein the processor is configured to perform receiving communication data associated with an electronic communication, wherein the communication data includes textual data, analyzing attachment data associated with an attachment to the electronic communication, comparing the communication data to the attachment data to determine a relevancy score, and based on the relevancy score, enacting an action for the electronic communication.

Embodiments of the invention are directed to a computer program product for electronic communication operation, the computer program product comprising a computer readable storage medium having program instructions embodied therewith. The program instructions are executable by a processor to cause the processor to perform a method. A non-limiting example of the method includes receiving communication data associated with an electronic communication, wherein the communication data includes textual data, analyzing attachment data associated with an attachment to the electronic communication, comparing the communication data to the attachment data to determine a relevancy score, and based on the relevancy score, enacting an action for the electronic communication.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 depicts a flow diagram of a method for electronic communication operation according to one or more embodiments of the invention.

Figure 1:
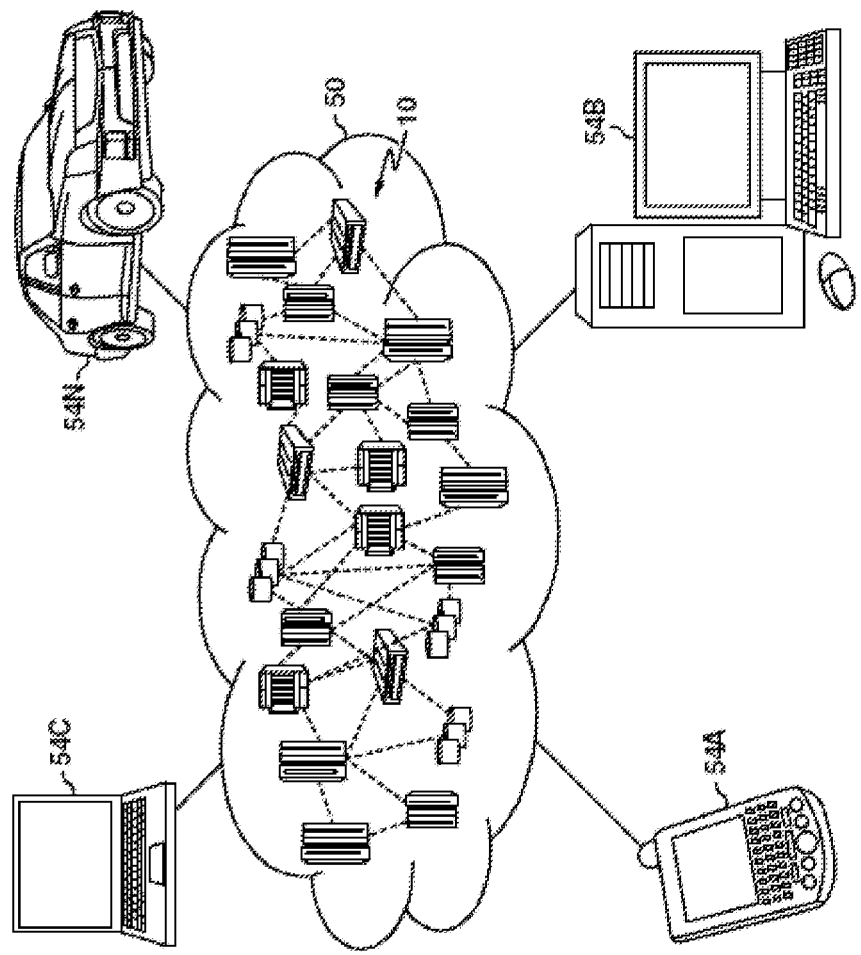
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
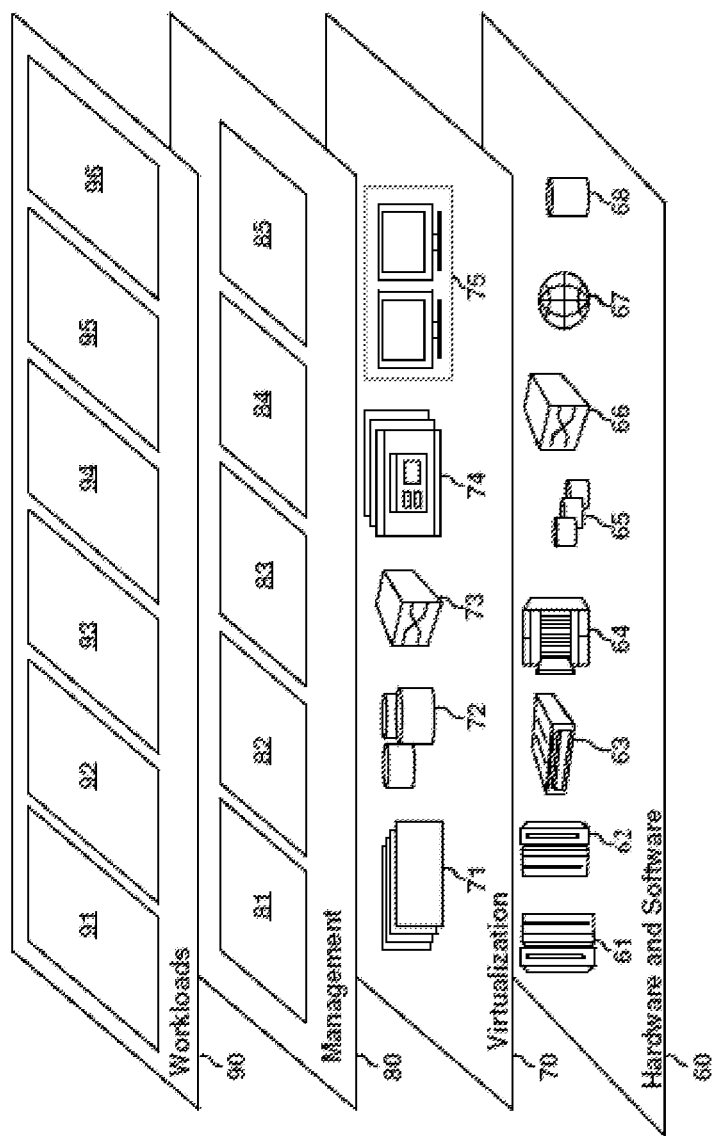
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and electronic communication operations with attachment analytics 96.

Figure 3:
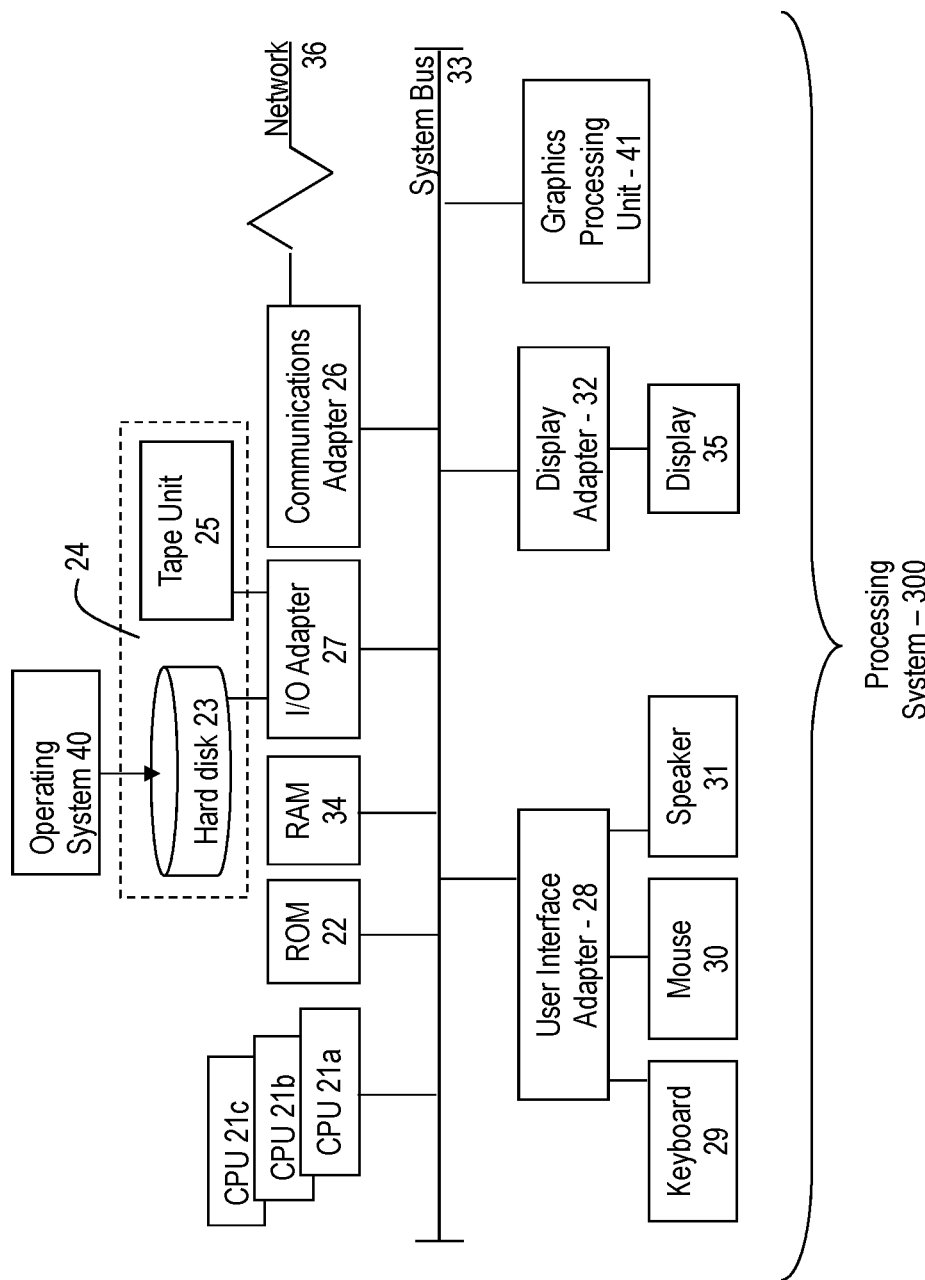
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. Hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. A graphics processing unit 41 is a specialized electronic circuit designed to manipulate and alter memory to accelerate the creation of images in a frame buffer intended for output to a display. In general, the graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system to coordinate the functions of the various components shown in FIG. 3.

By way of further overview, some embodiments of the invention enable an electronic communication solution that analyzes conversational artifacts such as, for example, email attachments content. Some embodiments of the invention detect a level of relevancy of a conversation content within an electronic communication based on the language pattern usage and compare the relevancy with one or more artifacts such as the attachment or a resource (e.g., URL) associated with the electronic communication. Electronic communications can include, but are not limited to, emails, text messaging, and social media postings. In addition to the relevancy of an instant electronic communication, historical communications can be analyzed to determine a relevancy of the instant communication to an attachment. For example, emails often have previous email messages contained in a new message when a user selects a reply. This can be referred to as a communication stream which can include examples such as email replies, text message replies, social media postings between users, and the like.

Figure 4:
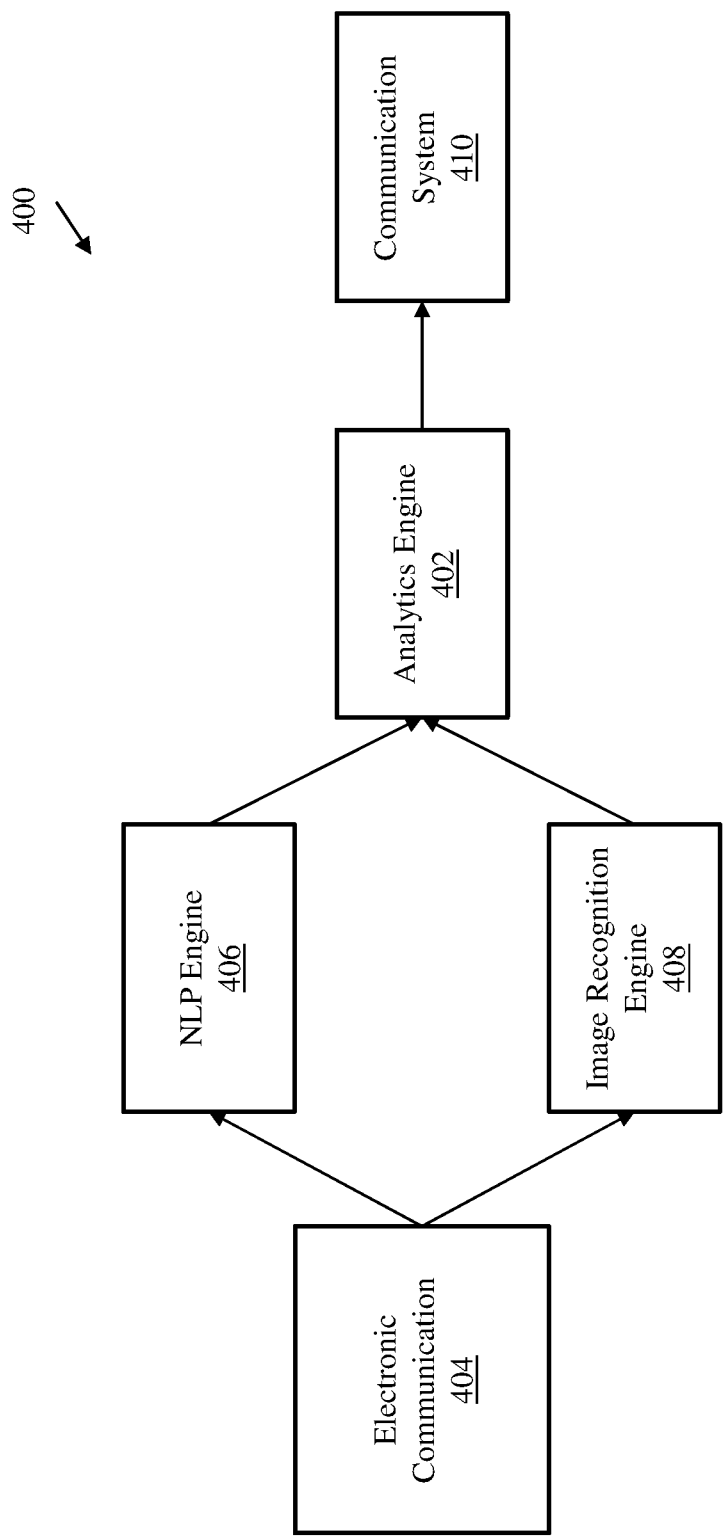
FIG. 4 depicts a block diagram of a system for operating electronic communications according to embodiments of the invention.

Turning now to a more detailed description of aspects of the present invention, FIG. 4 depicts a block diagram of a system for operating electronic communications according to embodiments of the invention. The system 400 includes an analytics engine 402, a natural language processing (NLP) engine 406, and an image recognition engine 408. In one or more embodiments of the invention, the system 400 can receive an electronic communication 404 and analyze the properties of the electronic communication 404 utilizing the NLP engine 406, image recognition engine 408, and analytics engine 402 to determine an action to enact prior to the electronic communication 404 going to the communication system 410. The communication system 410 can be, for example, an email program, a text messaging system, a social media website, and the like.

In one or more embodiments of the invention, the system 400 analyzes an artifact associated with the electronic communication 404. An artifact can include an attachment to the communication or a resource such as a URL. Based on an analysis of the artifact, the system 400 can determine a relevancy score between the artifact and the content of the electronic communication 404. That is to say, the system 400 determines whether the attachment to an electronic communication 404 is proper or is not proper. A non-limiting example includes an email message with an attached document being analyzed by the system. In the email message, a sender may reference a version number for the document (e.g., version 4). Data associated with the attached document can be analyzed to determine if the correct version of the document is properly attached to the email. The data associated with the attached document can include metadata such as file name, file history, save location, etc. which can be utilized to determine a file version history, for example. In addition, the data associated with the attached document can include the content of the document to be analyzed by the NLP engine 406 to extract properties for the attached document and compared to the content of the email message to determine a relevancy score.

In embodiments of the invention, the engines 402, 406, 408 can also be implemented as so-called classifiers (described in more detail below). In one or more embodiments of the invention, the features of the various engines/classifiers (402, 406, 408) described herein can be implemented on the processing system 300 shown in FIG. 3, or can be implemented on a neural network (not shown). In embodiments of the invention, the features of the engines/classifiers 402, 406, 408 can be implemented by configuring and arranging the processing system 300 to execute machine learning (ML) algorithms. In general, ML algorithms, in effect, extract features from received data (e.g., inputs to the engines 402, 406, 408) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 402, 406, 408 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In embodiments of the invention where the engines/classifiers 402, 406, 408 are implemented as neural networks, a resistive switching device (RSD) can be used as a connection (synapse) between a pre-neuron and a post-neuron, thus representing the connection weight in the form of device resistance. Neuromorphic systems are interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Thus, the activated output neuron determines (or "learns") which character was read. Multiple pre-neurons and post-neurons can be connected through an array of RSD, which naturally expresses a fully-connected neural network. In the descriptions here, any functionality ascribed to the system 400 can be implemented using the processing system 300 applies.

In one or more embodiments of the invention, the system 400 can analyze the content of an electronic communication 404 to extract features and build a feature vector based on the machine learning techniques described herein. In addition, any artifact associated with the electronic communication 404 (e.g., attached file, URL, etc.) can be analyzed to extract features associated with the artifact to build a feature vector for the artifact. In one or more embodiments, a relevancy score can be determined based on a geometric distance between the plotted feature vectors for both the electronic communication 404 data and the artifact.

In one or more embodiments of the invention, the NLP engine 406 can perform natural language processing (NLP) analysis techniques on the content of the electronic communication 404 and the metadata associated with the electronic communication 404 as well as an artifact (e.g., attachment, URL, etc.) associated with the communication. NLP is utilized to derive meaning from natural language. The NLP engine 406 can analyze the content of the electronic communication 404 and an artifact associated with the electronic communication 404 by parsing, syntactical analysis, morphological analysis, and other processes including statistical modeling and statistical analysis. The type of NLP analysis can vary by language and other considerations. The NLP analysis is utilized to generate a set of NLP structures and/or features which can be utilized by a computer to identify and generate a relevancy score between the electronic communication 404 and an artifact (e.g., attachment, resource, etc.). These NLP structures include a translation and/or interpretation of the natural language input, including synonymous variants thereof. The NLP engine 406 can analyze the features to determine a context for the features. NLP analysis can be utilized to extract attributes (features) from the natural language. These attributes include, but are not limited to, keywords, context, relationships between sender and receiver, historical communication associated with the electronic communication 404 and the like.

In one or more embodiments of the invention, the image recognition engine 408 can be utilized to analyze an attachment that includes images, videos, or other imaging data. Using image recognition techniques, the image recognition engine 408 can be utilized to determine content or a label for an image or video attachment to an electronic communication 404. The analytics engine 402 can utilize the content or labels generated for the attachment and compare to an output of the NLP engine 406 to determine a relevancy score 406 between the attached image and the electronic communication 404. For example, an attachment might be a picture of a boat on the ocean and the electronic communication might include content associated with a user referencing the attachment as being a picture of his or her car. The image recognition engine 408 might include labels such as, for example, boat, ocean, marine, etc. while the NLP engine 406 might extract keywords from the electronic communication 404 including reference to a car. The analytics engine 402 can generate a relevancy score that is low between the attachment and the electronic communication 404. In one or more embodiments, a relevancy score can be compared to a threshold score for determining an action to be taken. For example, if a relevancy score is below the threshold, the system 400 can generate an alert to the user to have the user confirm the correct attachment was used in the message. In other embodiments, a tiered threshold score can be utilized for enacting certain actions. For example, if a relevancy score is below a low tier threshold, the system 400 can stop the transmission of the electronic communication and generate an alert or a message to a user. If the relevancy score is above the low tier threshold but below the high tier threshold, an alert or message can be generated to the user to confirm before sending the communication. And if the relevancy score is above the high tier threshold, the system 400 can allow the electronic communication 404 to be transmitted or published to the communication system 410.

In one or more embodiments of the invention, the artifact associated with an electronic communication 404 can be a URL included in the electronic communication 404. The system 400 can access the URL and, utilizing the NLP engine 406 and image recognition engine 408, analyze the content of the URL which can be a file location or a web address. The analytics engine 402 can determine a relevancy score between the URL and the electronic communication 404 and enact an action based on the relevancy score. For example, an electronic communication 404 can be a posting on a social media website. The posting can include a link to a website and post references to the website. The analytics engine 402 can determine the relevancy score between the website link and the posting on the social media website and then enact an action such as withdrawing the post and confirming with the user that the web site is the correct website if the relevancy score is low or below a threshold. In one or more embodiments of the invention, a user of the system 400 can set relevancy score thresholds and preferences for actions based on the relevancy score.

In one or more embodiments of the invention, the artifact associated with an electronic communication 404 can be an app (mobile/tablet application) included in or associated with the electronic communication 404. The system 400 can access the app and, utilizing the analytics engine 402, analyze the content of the app or the functionality of the app as it relates to the electronic communication. The analytics engine 402 can determine a relevancy score between the app and the electronic communication 404 and enact an action based on the relevancy score.

In one or more embodiments of the invention, a communication stream can be analyzed in addition to the electronic communication 404. A communication stream can include, but is not limited to, email messages in an email chain, previous social media postings, re-postings of other user's postings, previous text messages in a text message chain, and the like. The communication stream can be utilized to determine the relevancy score for an attachment or can have a separate stream relevancy score to determine if an appropriate attachment is included with the electronic communication 404. For example, if a user is emailed a message requesting a certain file and the user replies with an attachment and the message content including, "Here is the file." This particular content might not provide sufficient context for the attachment; however, looking through the content of the communication stream, the requested file can be referenced in the previous email and compared to the current attachment of the electronic communication 404 to determine the relevancy score.

In one or more embodiments of the invention, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

FIG. 5 depicts a flow diagram of a method for electronic communication operations according to one or more embodiments of the invention. The method 500 includes receiving communication data associated with an electronic communication, wherein the message data includes textual data, as shown in block 502. At block 504, the method 500 includes analyzing attachment data associated with an attachment to the electronic communication. The method 500, at block 506, includes comparing the communication data to the attachment data to determine a relevancy score. And based on the relevancy score, the method 500 includes enacting an action for the electronic communication, as shown at block 508.

Additional processes may also be included. It should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving communication data associated with an electronic communication, wherein the communication data includes textual data, and wherein the electronic communication comprises a social media post on a social media platform, and wherein the social media post includes a uniform resource locator (URL) for a webpage;
   obtaining electronic communication stream data, wherein the electronic communication stream data comprises historical communications associated with the electronic communication;
   receiving, from a user, a set of thresholds comprising a first threshold;
   receiving, from the user, a set of actions associated with the set of thresholds, wherein the set of actions comprise a first action associated with the first threshold and a second action associated with the first threshold;

accessing the webpage through the URL to analyze content of the webpage;

determining a relevancy score based on comparing the communication data and the electronic communication stream data to the content of the webpage;

based on the relevancy score being below the first threshold, enacting the first action for the electronic communication, wherein the first action comprises removing the social media post; and based on the relevancy score being above the first threshold, enacting the second action for the electronic communication, wherein the second action comprises allowing posting of the electronic communication.

2. The computer-implemented method of claim 1, wherein determining the relevancy score comprises:

generating, using a machine learning model, a first feature vector comprising one or more features extracted from the textual data;

generating, using the machine learning model, a second feature vector comprising one or more features extracted from the webpage; and comparing the first feature vector to the second feature vector to determine a distance between the first feature vector and the second feature vector;

wherein the relevancy score is based at least in part on the distance.

3. A computer program product for electronic communication operations, the computer program product comprising a computer readable storage medium having program instructions embodied therewith, wherein the computer readable storage medium is not a transitory signal per se, the program instructions executable by a processor to cause the processor to perform a method comprising:

receiving communication data associated with an electronic communication, wherein the communication data includes textual data, and wherein the electronic communication comprises a social media post on a social media platform, and wherein the social media post includes a uniform resource locator (URL) for a webpage;

obtaining electronic communication stream data, wherein the electronic communication stream data comprises historical communications associated with the electronic communication;

receiving, from a user, a set of thresholds comprising a first threshold;

receiving, from the user, a set of actions associated with the set of thresholds, wherein the set of actions comprise a first action associated with the first threshold and a second action associated with the first threshold;

accessing the webpage through the URL to analyze content of the webpage;

determining a relevancy score based on comparing the communication data and the electronic communication stream data to the content of the webpage;

based on the relevancy score being below the first threshold, enacting the first action for the electronic communication, wherein the first action comprises removing the social media post; and based on the relevancy score being above the first threshold, enacting the second action for the electronic communication, wherein the second action comprises allowing posting of the electronic communication.

4. A system for electronic communication operations, the system comprising:

a processor communicatively coupled to a memory, the processor configured to:

receive communication data associated with an electronic communication, wherein the communication data includes textual data, and wherein the electronic communication comprises a social media post on a social media platform, and wherein the social media post includes a uniform resource locator (URL) for a webpage;

obtain electronic communication stream data, wherein the electronic communication stream data comprises historical communications associated with the electronic communication;

receive, from a user, a set of thresholds comprising a first threshold;

receive, from the user, a set of actions associated with the set of thresholds, wherein the set of actions comprise a first action associated with the first threshold and a second action associated with the first threshold;

access the webpage through the URL to analyze content of the webpage;

determine a relevancy score based on comparing the communication data and the electronic communication stream data to the content of the webpage;

based on the relevancy score being below the first threshold, enact the first action for the electronic communication, wherein the first action comprises removing the social media post; and based on the relevancy score being above the first threshold, enact the second action for the electronic communication, wherein the second action comprises allowing posting of the electronic communication.

* * * * *